Aug. 9, 1960   J. MAHAND   2,948,554
ROTARY SEAL
Filed July 29, 1957
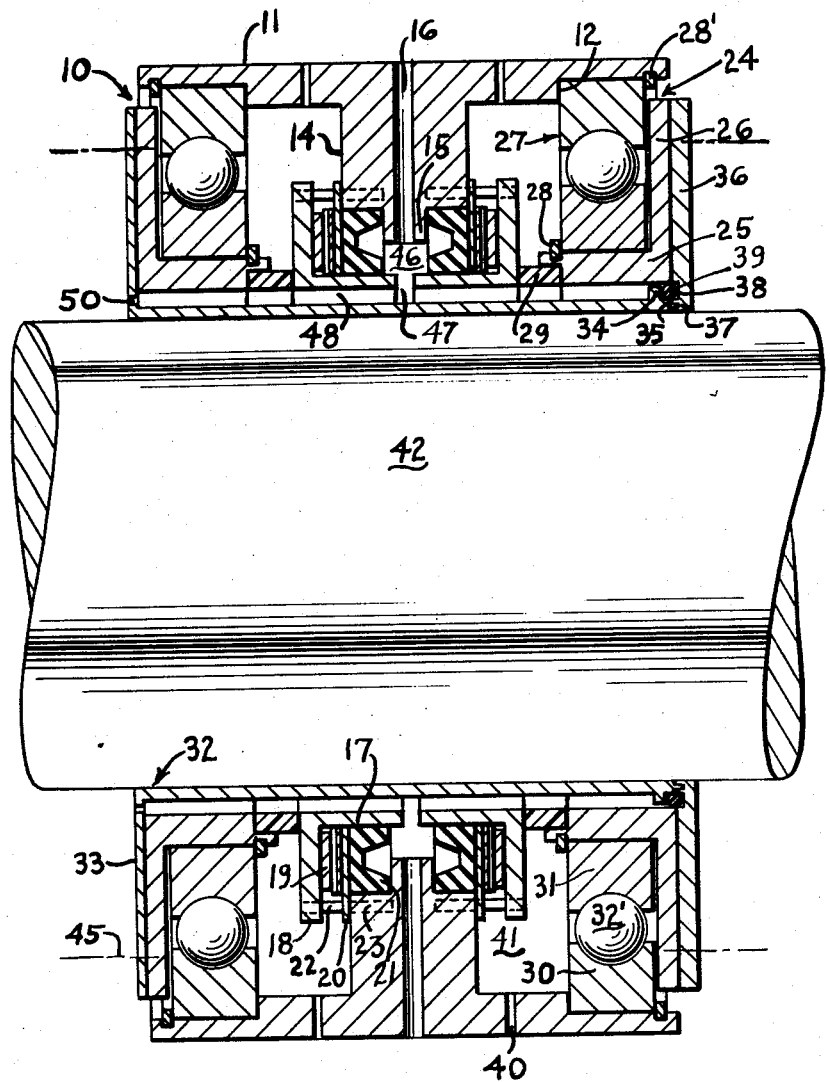
Jack Mahand
INVENTOR.
BY Wm. E. Ford
ATTORNEY United States Patent Office 2,948,554
Patented Aug. 9, 1960

2,948,554
ROTARY SEAL
Jack Mahand, Harris County, Tex.
(5706 Ridgeway, Houston, Tex.)
Filed July 29, 1957, Ser. No. 674,949
5 Claims. (Cl. 286—9)

This invention relates to a rotary seal whereby fluid may be transferred from a stationary member to a rotary member which has been fixed to rotate with a rotary object, as a shaft, the rotary member sealing with the stationary member as it rotates, and fluid as compressed air passing from the stationary member to the rotary member and outwardly therefrom without the necessity of first passing into the rotary object.

The invention has as its primary object the provision of a rotary seal of this class which is easily installed on a rotary member and which provides a stationary part to receive fluid and a part which rotates with the rotary member and seals with the stationary part while receiving and transmitting fluid therefrom.

It is also an object of this invention to provide a rotary seal of this class having a balance of rotary part thrust against stationary parts.

It is another object of this invention to provide a rotary seal of this class which is specially adapted to seal effectively against compressed fluid loss as it passes through the stationary housing and also as it passes through the rotary part of the seal.

It is still a further object to provide a rotary seal of this class which is easily assembled and easily installed upon a rotary member.

Other and further objects will be apparent when the specification herein is considered in connection with the single figure comprising the drawing, such figure being a sectional elevation of the invention as installed on a shaft.

Referring in detail to the drawing, the device 10, which may be termed a rotary seal, comprises a cylindrical housing 11 which is counterbored at either end to provide shoulders 12. Centrally of the housing a ring or partition 14 extends radially inwardly and the innermost part thereof is counterbored from each end to provide a rim 15. A fluid passage 16 extends radially from the exterior of the housing through the ring 14 and rim 15 to convey fluid, as compressed air, through the housing the attachment of a fluid line to the housing not being shown, but such may be accomplished by the obvious expedient of tapping the inlet into the passage to receive a fitting to which a flexible conduit or a rigid pipe conduit may be affixed.

Plungers 17 are provided to be positioned in spaced apart, back-to-back relation. Each plunger has a flange 18 on the outer end thereof, and a spring 19 is provided to fit upon the plunger to bear against the inner face of the plunger flange 18. Inwardly of the spring 19 an annular spacer 20 is provided to fit upon the plunger 17 and such spacer separates the spring 19 from the back of a double lip type seal 21 which also fits upon the plunger 17, such seal being comprised of a resilient material such as rubber, such seal fitting outwardly against the inner face of the ring 14 and the outer lip thereof bearing axially inwardly against the rim 15. Dowels 22 are press fitted into bores in the plunger flanges 18 near the outer edges thereof and such dowels pass with clearance through holes in the spacer 20 and slidably into bores 23 in the ring 14 and thus the plunger 17 is positioned concentrically with relation to the axis of the housing 11, and the double lip seal 21 is positioned to bear against the ring 14 as hereinabove described.

Outwardly of each plunger assembly a closure carrier assembly 24 is provided which includes a cylindrical carrier 25 having a flange 26 on the outer end thereof. A ball bearing assembly 27 is mounted upon the carrier 25 adjacent the carrier flange 26, and the carrier has a peripheral groove of rectangular cross-section therein adjacent the ball bearing assembly 27 to receive a slip ring 28 which retains the ball bearing assembly 24 restrained against axial displacement and confined between the slip ring and the flange 26. The carrier 25 is counterbored in its inner end to have press fitted thereinto a seal ring 29, as of hardened, wear resistant carbon against the inner side of which is urged the outer face of the plunger flange 18.

The housing 11 has an internal groove of rectangular cross-section therein near the outer end thereof, and a slip ring 28' is fitted thereinto to bear against the outer face of the outer race 30 of the ball bearing assembly 27. Then since the slip ring 28 in the carrier 25 bears against the inner face of the inner race 31 of such ball bearing assembly the carrier 25 is thus fixed with relation to the housing 11. Then, as the carrier flange 26 extends radially outwardly past the ball bearings 32' of the ball bearing assembly 27 and with its inner face in closing adjacency to the outer faces of the ball bearing races 31 and 30, the flange 26 in cooperation with the outer race 30 acts as the end closure for the housing 11.

A sleeve 32 is provided having a flange 33 on one end thereof, and such sleeve is of lesser outer diameter than the inner diameters of the carriers 25, the seal rings 29, and the plungers 17. A ring 34 is provided on the sleeve 32 opposite its flanged end of lesser outer diameter than the inner diameters of the carriers 25, seal rings 29, and plungers 17, and the end of the sleeve adjacent this ring 34 is slightly counterbored and slightly turned down outwardly to provide an annular tongue 35.

An annular flange, ring, or disc 36 is provided of substantially the inner diameter of the sleeve 32, and of substantially the outer diameter of the carrier flange 26. Such ring flange 36 has an annular groove 37 provided in the inner face thereof to receive the tongue 35 and outwardly thereof another annular groove 38 is provided of inner diameter of the outer diameter of the sleeve 32 and of outer diameter of the inner diameter of the carrier 25. A conventional O-ring seal 39, of a resilient matter, as rubber or neoprene, is insertable in the groove 38 to be carried on the ring flange 36.

In assembly the plunger assemblies may be assembled with the housing 11, and then the carrier assemblies assembled with the housing 11 on either side thereof to close the ends of the housing. Then a lubricant, as a light or heavy grease may be injected through openings 40 in the housing to fill the spaces 41 between carrier and plunger assemblies and the housing ring 14 to lubricate the surfaces between seal rings 29 and plungers 17 and to lubricate the ball bearings 32'. Suitable grease injection fittings, not shown, as conventional Alemite fittings, may be installed in the housing 11 at the outer ends of the openings 40 for the supplying of the lubricant for this purpose.

Completion of the installation of this rotary seal invention may be effected by steps as follows. First the sleeve 32 may be slid upon an object on which the invention is to be installed, as a shaft 42, to a desired position thereon. There the sleeve 32 is affixed to the shaft, as by a conventional key and key-way arrangement. Optionally conventional set screws may be employed to affix the sleeve to the shaft. Then the housing, with the plunger and carrier assemblies thereon, is slid leftward upon the shaft 42, as viewed in the drawing, and over the ring 34 of the sleeve, which may thus serve as a guide, and the left carrier flange 26 is brought into abutment with the inner face of the sleeve flange 33. Then the sleeve and the carrier are connected by means of suitable cap-screws, installed upon the bolt circle diameter 45 as indicated in dotted center lines in the drawing, and the housing assembly is thereby positioned at its left end in concentricity with the shaft and sleeve axis.

The ring flange 36 may then be slid upon the shaft 42 to abut the right carrier flange 26, and in so doing the tongue 35 is brought into the groove 37 therefor, and the O-ring 39 is brought into compressed abutment against the ring 34. The ring flange 36 is now connected to the right carrier flange 26 by means of cap-screws, installed upon a bolt circle diameter 45 as indicated in dotted center lines in the drawing, and the housing assembly is thereby positioned at its right end in concentricity with the shaft and sleeve axis, and when the cap-screws are tightened full up, the O-ring 39 is fully and positively compressed to seal against fluid passage outwardly between the carrier flange and ring flange, or inwardly between the sleeve and the ring flange and between the ring flange and the shaft.

When this installation is completed, the housing may be connected to anchor it against rotation, as by connecting it to a support extending upwardly from a base, as the floor, or as by connecting it to a hanger from the ceiling, or in any other manner. Then the shaft may be rotated at any desired speed and the carrier assemblies connected respectively to the sleeve and to the ring flange must rotate therewith so that the frictional planes of radial contact between rotary members and stationary members are the planes of contact between the inner faces of the carbon seal rings 29, which rotate with the carriers 25, and the yieldably outwardly urged plungers 17 which are connected to the housing ring 14 by the dowels 22, and hence cannot rotate.

The peripheral area of separation between the stationary and rotary members occurs between the balls 32 of the ball bearing assembly 27, and the outer ball bearing races 30 which are fixed to the housing 11, the inner races 31 being fixed to the rotating carriers 25.

When a pressurized fluid, as compressed air, is injected into a passageway, or into a plurality of passageways 16, the fluid passes into the space 46 inwardly of the rim 15 to expand the double lip seals 21 to force outwardly to firmly seal against fluid passage between the plungers 17 and the seal rings 29, and against fluid passage between the seal rings 29 and the housing ring 14. Such expansion also urges the spacers 20 and crimped springs 19 outwardly, as the spacers 20 slide guidably upon the dowels 22, and the seals 21 thus abet the force of the springs 19 in biasing the plungers 17 into contact with the carbon seal rings 29.

From the space 46 the compressed fluid may pass through the space 47 between the two back-to-back plungers 17, and into the space 48 between the sleeve 32 and the inner surfaces of the plungers 17, seal rings 29, and carriers 25. The O-ring seal 39 prevents fluid escape from the right hand end of the space 48, and the firm urging of the plungers 17 against the seal rings 29 prevents outward escape of fluid thereby into the lubricant spaces. The fluid thus may escape only through an opening or openings 50 provided in the sleeve flanges 33 at the end of the space 48 opposite the O-ring seal 39.

An invention as hereinabove described, may be used on many occasions where it may be desirable to convey a pressurized fluid, as a gas such as compressed air, or in cases a liquid, from a stationary member to a rotary member and from thence to either a rotary or stationary member. For instance the discharge from the outlet opening 50 may be directed into a clutch part which rotates with or about the shaft 42, or it may be discharged into a stationary member which seals with the shaft 42 at some point spaced to the left of the flange 33 as shown in the figure.

The seal structure which includes the O-ring seal 39 is not the only structure for accomplishing this purpose, and also the plunger assembly, and carrier assembly may be varied in detail. Broadly the invention is not at all limited to the details of construction shown in the figure, but other details are considered as well as such may fall within the broad spirit of the invention, and within the broad scope of interpretation claimed and merited for the appended claims.

What is claimed is:

1. A rotary seal comprising a housing having a ring centrally thereof projecting radially inwardly therefrom and a rim centrally of said ring projecting radially inwardly therefrom, a pair of cylindrical plungers each with a flange on the end thereof to be installed in coaxially spaced apart relation within, and radially spaced from said housing with said flanges longitudinally outwardly of said ring, a circular spring radially crimped carried on each plunger adjacent the flange thereof, a spacer ring carried by each plunger adjacent to and on the opposite side of the spring thereon from the plunger flange, axially extending dowel holes on opposite sides of said ring, a dowel extending from the flange of each plunger into the dowel hole adjacent thereto to guide the plunger in axial movement, a lip type seal on each side of said rim with lip in rim contact, said seal being confined radially outwardly by said ring, radially inwardly by the adjacent plunger, and axially outwardly by said spacer ring, a seal and bearing assembly at each end of said housing comprising a tubular carrier having a flange longitudinally outwardly thereon, a ball bearing assembly carried on said carrier concentric therewith, and adjacent said carrier flange, and a cylindrical carbon seal coaxially inwardly of said carrier and insertable thereinto, means inwardly of said bearing assembly latching it to said carrier, and means outwardly of said bearing assembly latching it to said housing and thereby positioning said carbon seal to be yieldably borne against by the plunger flange adjacent thereto as urged by the adjacent spring, a sleeve of lesser outer diameter than the inner diameters of said plungers, said carbon seals, and said carriers and insertable therewithin and having a flange on one end thereof to bear inwardly against the outer flange face of the adjacent carrier, means connecting said sleeve flange to the adjacent carrier flange to space said sleeve concentrically with relation to said plungers, carbon seals, and carriers to provide an air space therebetween, an annular flange of substantially the same inner diameter as the inner diameter of the sleeve and adapted for connection to the outer face of the other carrier flange, means for connecting said annular flange to the adjacent carrier flange, means provided by said annular flange and said sleeve to seal against fluid escape from said air space and past said annular flange, passage means from said air space outwardly through said sleeve flange, means to connect said sleeve for rotation with a rotary member upon which said sleeve may be installed, and port means provided in said housing and extending inwardly through said rim whereby fluid under pressure may be injected to pass between said lip seals to sealably force them against said ring, said spacer rings, and said plungers to thereby bias said spacer rings against said circular springs and said circular springs against said plunger flanges to urge them into sealing contact with said carbon seals, said pressure fluid passing through the space between inner ends of said plungers into said air space and therefrom out through said sleeve flange as said sleeve, said carriers including said carbon seals, and the inner races of said ball bearing assemblies rotate with said rotary member and said carbon seals maintain rotary contact with said plungers which are held stationary.

2. A rotary seal comprising a stationary housing having a ring projecting inwardly therefrom and providing a passage centrally through said ring to the housing exterior, a pair of cylindrical, outwardly flange ended plungers in co-axially spaced apart back-to-back relation within said housing, each carrying successively inwardly spaced from its end flange a spring to bias said plunger axially outwardly and a double lip type seal to seal against fluid escape from said passage past said ring and plunger and to bias said spring axially outwardly, means provided by said plunger and said housing for spacing said plungers concentrically with relation to said housing and to guide said plungers in axial movement, each end of said housing having therewithin a cylindrical, outwardly flange ended carrier carrying thereon a ball bearing assembly and a seal ring co-axially mounted inwardly to bear sidewardly against the plunger adjacently inward thereof, means to latch said ball bearing assembly outwardly to said housing and inwardly to said carrier, a tubular sleeve adapted for connection to a rotary element and having one end flanged, means connecting said sleeve flange to the adjacent carrier flange inwardly thereof to position said sleeve in concentric spaced relation from said carriers, said seal rings, and said plungers to thereby provide a fluid space, an annular flange connectable to the other carrier flange and having an inner diameter not less than sleeve inner diameter, means including means provided by said sleeve and said annular flange to seal against fluid escape thereby from said fluid space, and a fluid escape port from said fluid space through said sleeve flange whereby fluid injected into said ring may expand said lip seals to urge said springs outwardly and may pass between said plungers and from said fluid space outwardly through said escape port as said housing and said plungers are restrained against rotation while said sleeve and said carriers including said seal rings rotate with said rotary member and said plungers are urged into sealing contact against said seal rings by said springs and said lip seals.

3. A rotary seal comprising a stationary housing assembly including the housing and opposed yieldably outwardly urged plungers sealable with said housing which provides a central radially extending fluid passage from the housing exterior to the interior between said plungers, closure carrier assemblies at either end of said housing including ball bearing assemblies between said housing and said carriers and seal rings co-axially aligned inwardly with said carriers to bear sidewardly in sealing relation with said outwardly urged plungers, a tubular sleeve adapted for connection to a rotary element and having one end flanged, means connecting said sleeve flange to the adjacent carrier assembly inwardly thereof to position said sleeve in concentric spaced relation from said carriers, said seal rings, said housing, and said plungers to thereby provide a fluid space therebetween in fluid communication with said fluid passage, an annular flange connectable to the other carrier assembly and having an inner diameter not less than sleeve inner diameter, means including means provided by said sleeve and said annular flange to seal against fluid escape thereby from said fluid space, and a fluid escape port from said fluid space through said sleeve whereby pressurized fluid circulated into and from said fluid passage may pass between said plungers and through said fluid space and out said sleeve flange as said housing and said plungers are restrained against rotation while said sleeve and said carrier assemblies including said seal rings rotate with said rotary member and said plungers are urged by said pressurized fluid into sealing contact against said seal rings.

4. In a rotary seal the combination of a stationary housing assembly including a housing having a central, radially inwardly extending ring and providing a flow passage from the housing exterior through said ring, a sleeve adapted for connection to the periphery of a rotary member as a shaft and having a flange on one end thereof, a plunger assembly movably mounted on either side of said housing ring comprising a plunger carrying biasing means, including means responsive to pressurized fluid passing inwardly from said housing to bias said plunger axially outwardly, a closure carrier assembly at either end of said housing including a carrier having a sealing ring carried co-axially therewith with inner side face to bear against the adjacent plunger, a ball bearing assembly carried by said carrier, and a closure and connection flange included by said carrier to extend radially outwardly past the inner surface of the outer race of said ball bearing assembly, one of said carrier flanges being connectable to abut the inner face of said sleeve flange to position said housing assembly at the sleeve flange end concentrically with said shaft and sleeve axis, a ring flange slidable upon said sleeve and connectable to the other carrier flange to position said housing assembly opposite the sleeve flange concentrically with said shaft and sleeve axis, said sleeve being of lesser outer diameter than the inner diameter of said carrier assemblies, said seal rings, and said plunger assemblies to provide a fluid space therebetween in fluid communication with said flow passage through said ring, said sleeve and said ring flange providing a seal to prevent fluid escape from the end of said space adjacent thereto, and said sleeve flange providing outlet port means therefrom whereby as said sleeve, carrier, seal rings and the inner parts of said ball bearing assemblies rotate with said shaft, whereby pressurized fluid may be injected into said housing to abet the biasing of said plungers into fluid sealing relation with said seal rings, and said pressurized fluid may pass into said space and out through said outlet port means into a pressurized fluid receiving means.

5. A rotary seal including a stationary housing providing a fluid space therein, a sleeve mountable to rotate with a rotary object, as a shaft, spaced apart plunger means movably mounted back to back in axially spaced apart relation centrally within said housing and carrying means thereon to yieldably urge said plungers axially outwardly, closure assemblies for the ends of said housing comprising carriers radially spaced apart from said sleeve to provide a fluid space to communicate with said housing fluid space through the space between said plungers, said carriers being connected to said sleeve and including anti-friction means mounted by said carriers between said housing and said closure assemblies and seal means carried by said closure assemblies and positioned thereby to be sealably urged against by said plungers as said closure assemblies rotate with said sleeve, said sleeve providing an outlet therethrough from said carrier fluid space, and pressurized fluid circulated through said housing and carrier fluid spaces and out said outlet also serving to abet said yieldably urging means in urging said plungers axially outwardly.

References Cited in the file of this patent

UNITED STATES PATENTS

| | | |
|---|---|---|
| 2,384,281 | Carter | Sept. 4, 1945 |
| 2,430,918 | Curry | Nov. 18, 1947 |
| 2,777,702 | Rodal | Jan. 15, 1957 |

FOREIGN PATENTS

| | | |
|---|---|---|
| 741,751 | Germany | Sept. 30, 1943 |